RECEIVER SYSTEM COMPRISING A TRANSISTORIZED AGC CIRCIUT

Original Filed March 20, 1961 2 Sheets-Sheet 1

INVENTORS
Albert W. Massman
Raymond C. Voige
BY Mueller & Aichele
Attys.

RECEIVER SYSTEM COMPRISING A TRANSISTORIZED AGC CIRCIUT

Original Filed March 20, 1961 2 Sheets-Sheet 2

INVENTOR.
Albert W. Massman
BY Raymond C. Voige
Mueller & Aichele
Attys.

United States Patent Office 3,306,976

Patented Feb. 28, 1967

3,306,976

RECEIVER SYSTEM COMPRISING A TRANSISTORIZED AGC CIRCUIT

Albert W. Massman, Wheaton, and Raymond Charles Voige, Chicago, Ill., assignors to Motorola, Inc., Chicago, Ill., a corporation of Illinois Continuation of application Ser. No. 96,874, Mar. 20, 1961. This application Mar. 13, 1964, Ser. No. 352,717

11 Claims. (Cl. 178—7.3)

This invention relates to wave signal receivers and more particularly to a gain control circuit especially useful in a transistorized television receiver. The present application is a continuation of application Serial No. 96,874, filed March 20, 1961.

It is common to provide a gain control system in a television receiver in order to maintain relatively constant signal reproduction with variation in signal input level. This is most apparent in the maintenance of a given image contrast, for example, in switching between different channels which may have signals of different strengths. It is highly advantageous if such gain control can be automatic so that only a minimum attention is required by a user of the receiver.

As is generally recognized, a television receiver should be designed to amplify a relatively weak signal in order to establish a favorable signal-to-noise ratio and promote the best possible reproduction. However, in the case of strong signals, the receiver stages can be overloaded thus raising problems of distortion, cross modulation and the like, if the receiver gain is not reduced. It has been found that in the present state of the transistor art, the same techniques used for overcoming these difficulties in tube receivers may not be directly applicable to transistors for obtaining equally effective results.

In prior art vacuum tube television receivers it is known to gate the automatic gain control circuit (thus providing a gated automatic gain control or GAGC) at the horizontal sweep rate of the receiver so that the gain control system effectively samples the incoming desired signal only during the horizontal synchronizing pulses thereof. This has the advantage of regulating the receiver gain according to the level of the horizontal synchronizing tips of a received signal and rendering the receiver gain independent of the video signal information between such synchronizing pulses which could cause gain variation dependent upon the average picture content. Such a gated system also prevents the automatic gain control from responding to high energy noise pulses occurring between the synchronizing pulses which otherwise could cause false gain control of the receiver.

A still further area of difficulty in automatic gain control systems is the response speed of the system. Generally if the system is constructed to respond to rapid fluctuations of a desired signal, it is possible that extraneous noise pulses or even synchronizing pulses of the desired signal can cause variation in gain control level and consequent changes in the reproduction of the received signal. On the other hand, a system which responds slowly, while overcoming the difficulty of the usual rapidly responsive system, is oftentimes too slow in following signal variations caused, e.g., by signal reflections from a moving object, such as an airplane flying near the antenna for the receiver. Reproduction of the signal by the receiver thus varies due to the relatively slow response of the automatic gain control system and the inability of the gain control to follow rapid signal changes.

It is a general object of this invention to provide a transistorized, gated automatic gain control system for a television receiver which has an improved response time to signal level changes.

Another object is to provide a transistorized television receiver capable of handling a wide variation of signal input level while at the same time maintaining desirable linearity and minimizing distortion and cross modulation within the receiver.

A further object is to provide a transistorized gain control system with adjustable delay circuitry to regulate the relative gain control of the radio frequency and intermediate frequency stages of the receiver for optimizing the signal handling capabilities and signal-to-noise ratio of the receiver.

A still further object is to provide an improved transistorized, gated automatic gain control system for a television receiver which maintains picture image contrast with a change in signal level and which further minimizes response of the receiver to noise pulses accompanying the received signal.

A feature of the invention is the provision of an improved, transistorized, gated automatic gain control system with a transistor controlled by the video signal and also gated by horizontal synchronizing signals in the receiver and an amplifier and filter circuit to develop a control potential proportional to the received signal strength.

Another feature of the invention is the provision of such a gain control system which utilizes an active filter having a capacitor in a negative feedback network for rendering the system rapidly responsive to change in signal level, while at the same time providing the necessary filtering action for the control potential.

Another feature is the provision of a gain control system in a transistorized television receiver including a manual control for setting the gain operating range and including circuit means to apply a minimum fixed bias to an intermediate frequency amplifier of the receiver to furnish an effective delay for the gain control which is automatically applied in response to signal level changes to the radio frequency and intermediate frequency amplifiers of the receiver.

A still further feature of the invention is the provision of a forward biased, transistorized, automatic gain control system for improved gain control of transistor amplifiers and a wide range gain adjusting circuit for maintaining the desired signal at a given reference level to improve reproduction thereof by the receiver.

In summary, the automatic gain control system of the invention as incorporated in a transistorized television receiver includes a gating transistor which is direct current coupled through a video amplifier to the second detector in the receiver. The gating transistor is keyed, or gated, into conduction by horizontal sweep signals in the receiver which are synchronized with the horizontal synchronizing pulses of the received or desired signal. A resultant control signal, proportional to the level of the synchronizing pulses in the received signal, is applied to an AGC amplifier transistor. The amplifier transistor provides filtering of the control signal through a negative feedback capacitor network so that a relatively high effective filtering capacitance is established at higher signal levels and lesser effective capacitance at lower levels so that there is a minimum effective RC time constant and rapid response of the system at different levels of the received signal. The control signal is used as a gain control for the base bias circuits of transistors in the radio frequency and intermediate frequency amplifier sections of the receiver. Preferably the gain controlled transistors are forward biased to decrease the gain therein, that is, they are driven into saturation for gain reduction, thus tending to minimize non-linear operation thereof upon gain reduction in these stages.

A manual control is also included for setting the range within which the automatic gain control is effective. In one position thereof automatic gain control is applied only to the intermediate frequency amplifier of the receiver. In another position of this control a minimum bias is placed on the intermediate frequency amplifier and automatic gain control is applied to both the radio frequency and intermediate frequency amplifiers. Thus, the desired signal must exceed a level associated with the minimum bias of the intermediate frequency amplifier before any gain control is developed and this effectively delays the development of gain control until the signal exceeds such level. It has been found desirable to operate the gating transistor to conduct on the synchronizing signal tips when the video amplifier transistor feeding the gating transistor is near saturation. Accordingly, the receiver gain will be automatically adjusted by the gain control system to hold the synchronizing tips at this level regardless of the contrast control setting of the video amplifier stage or regardless of the gain setting of the video amplifier. Therefore, effective noise clipping can be obtained for all signal conditions since noise pulses exceeding the level of the synchronizing signal tips would be limited at the saturation level of the video amplifier.

Figure 1:
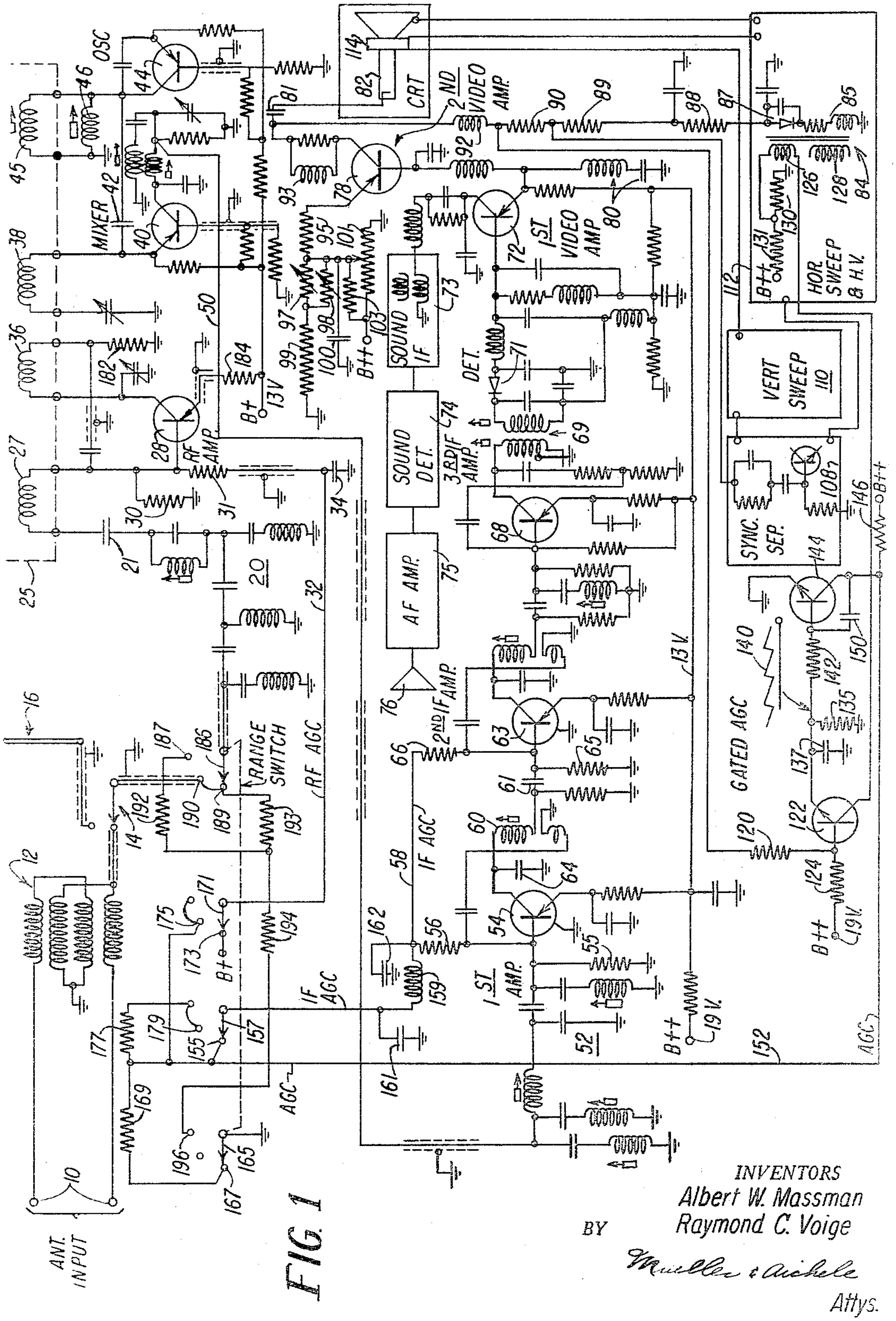
FIG. 1 is a diagram, partly schematic and partly in block, showing a television receiver incorporating one form of the invention.

In the battery operated transistorized television receiver of FIG. 1, an external antenna may be connected to the terminals 10 which are connected through the balun transformer 12 to one terminal of the selector switch 14. Another terminal of selector switch 14 is connected to a monopole antenna 16 which may be mounted as a structural part of the television receiver. The movable contact of selector switch 14 is connected to the input trap network 20. Accordingly, it may be seen that switch 14 is used to select either signals that are picked up by the monopole antenna 16 or signals as picked up by an external antenna connected to terminals 10.

Input trap network 20 is connected through the capacitor 21 to the tuning selector 25 which will be understood by those familiar with the art to include a switching system for a plurality of reactive elements for tuning the receiver to the different TV channels on which reception is desired. As will be evident subsequently, the tuning selector 25 includes four different tuning circuit portions, only representative ones being shown, for tuning the input and output of the RF amplifier, the input of the mixer and for tuning the local oscillator in the superheterodyne television receiver. The tuning inductor 27 in the selector 25 is coupled from the input capacitor 21 to the base electrode of the RF amplifier transistor 28. The base electrode of transistor 28 is also connected to the junction of resistors 30 and 31 which are series connected between ground and the RF AGC lead 32. The lead 32 is bypassed by means of a filter capacitor 34. Output signals from transistor 28 are derived in the tuning inductor 36 which is coupled to the tuning inductor 38 of the input circuit of the mixer stage of the receiver. The mixer stage includes a transistor 40 to the emitter of which the signals from tuning inductor 38 are applied. The emitter electrode of transistor 40 is also connected through the coupling capacitor 42 to the collector of transistor 44 which provides the local oscillator signal for the receiver. The local oscillator is tuned by means of the inductor 45 in the tuning selector 25. In accordance with known practice, a fine tuning inductor 46 is connected across conductor 45 in order to permit slight variation of the frequency of the local oscillator signal thereby slightly changing the frequency of the intermediate frequency signal produced by the mixer transistor 40 and permitting a shift of this signal within the band pass characteristic of the receiver.

The desired signal, converted to intermediate frequency, is derived from the collector electrode of the mixer transistor 40 and applied by way of shielded lead 50 to the tuned trap network 52 of the first intermediate frequency amplifier. This intermediate frequency amplifier includes a transistor 54 to the base electrode of which the signals are applied. The base is also connected to the junction of series connected bias resistors 55 and 56 which are series connected between ground and the IF AGC lead 58. The output signals from transistor 54 are derived at the collector electrode and applied through the tuned coil 60 and blocking capacitor 61 to the base electrode of transistor 63 in the second IF amplifier. Coil 60 is series tuned by means of capacitor 64 connected between the collector of transistor 54 and ground.

Base bias for the transistor 63 is established by connecting the base electrode thereof to the junction of the resistors 65 and 66 which are series connected between ground and the IF AGC lead 58. The output signal from the collector of transistor 63 is coupled to the base electrode of the transistor 68 in the third IF amplifier. The amplified signals from this transistor are derived in the collector circuit thereof and applied by way of the tuned transformer 69 to the second detector including the rectifier diode 71. The demodulated video signals including the video and synchronizing components, and the sound subcarrier are derived from the second detector and DC coupled to the base electrode of the transistor 72 in the first video amplifier. The sound subcarrier is fed from the collector electrode of transistor 72 to the sound intermediate frequency amplifier 73. The sound subcarrier signal in amplified form is then applied to the sound detector 74, where it is demodulated, and then to the audio frequency amplifier 75 for reproduction by the loudspeaker 76.

The video signal components are available at the emitter electrode of the transistor 72 and this electrode is direct current connected to the base electrode of transistor 78 in the second video amplifier. It may be noted that the emitter electrode of transistor 72 is connected to the series tuned trap 80, which is tuned to the 4.5 megacycle sound IF frequency, to remove the sound signal from the signals applied to the second video amplifier. The amplified video signals available from the transistor 78 are derived at the collector electrode thereof and applied through the blocking capacitor 81 to the cathode of the cathode ray picture tube 82. Since it is contemplated that the television receiver may operate from a battery source providing a potential of the order of 20 volts, it may be necessary to utilize a higher voltage for energizing the transistor 78 in the second video amplifier stage for proper drive of the tube 82. Accordingly, the horizontal output transformer 84 includes a winding 85 which is connected to a rectifier circuit 87 to provide a direct current potential of the order of −100 volts. This potential is applied to the collector electrode of transistor 78 through the filter resistor 88 and the isolating resistors 89 and 90, as well as the peaking coils 92 and 93.

The emitter circular of transistor 78 includes a biasing network comprising resistor 95 series connected with a parallel combination of variable resistors 97 and 98 and the further resistor 99. Resistor 97 is a contrast control operative to change the emitter bias of transistor 78 and thus the level of the video signal applied to the cathode ray tube 82. Resistor 98 is a variable resistor of substantially higher value than that of resistor 97 in order to set the level of the maximum bias obtainable with the contrast control 97. The junction of resistors 95 and 97 is bypassed by capacitor 100. The junction of resistors 95 and 97 is also connected to the variable arm of a potentiometer 101 which has a fixed portion connected between ground and B++, or +19 volts. A resistor 103 is also connected between the arm of potentiometer 101 and B++. Potentiometer 101 is an AGC control for setting the white level of the video signal with respect to the cutoff level of the transistor 78, as will be explained subsequently in greater detail.

The composite video signal is derived at the junction of resistors 89 and 90 in the collector circuit of the second video amplifier transistor 78 and coupled to the synchronizing signal separator 108. In circuit 108 the horizontal and vertical synchronizing signals are separated for application to the vertical sweep system 110 in the horizontal sweep system 112. Vertical sweep system 110 provides sawtooth signals at the vertical field or sweep rate, namely 60 cycles per second, and these are coupled to the deflection yoke 114 on the neck of the cathode ray tube 82. The horizontal sweep system 112 also develops sawtooth signals at the horizontal or line scanning rate, namely 15.75 kc. and these are applied to the deflection yoke 114. The horizontal sweep circuit 112 may further develop a suitable high voltage potential for the screen of the cathode ray tube 82.

To apply changes in the level of the desired or received signal to the gain control system, the junction of resistor 90 and coil 92 is connected through a resistor 120 to the base electrode of the gating transistor 122. The base of transistor 122 is further connected through a resistor 124 to the B++ potential supply of 19 volts. Accordingly, a voltage divider is established by resistors 120 and 124 in the connection of these resistors between the B++ supply and the negative direct current potential existing at the collector of transistor 78. It will also be observed that the video detector diode 71 is direct current coupled through the base-emitter path of transistor 72 and the base-collector path of transistor 78 to the base electrode of gate transistor 122. Through this path the demodulated video signal, including the synchronizing components at both horizontal and vertical frequency, as well as video signal components, will be applied to transistor 122 at a level which is directly associated with the strength of the received signal.

The collector electrode of transistor 122 is connected to the winding 126 which is on the core of the horizontal output transformer 84. It will be understood by those familiar with this art that voltage pulses at the horizontal sweep rate, namely 15.75 kc., are developed in the primary winding 128 of transformer 84 and that corresponding voltage pulses will be introduced into winding 126. The other terminal of winding 126 is connected to the junction of the resistors 130 and 131 which are series connected between ground and B++. Voltage divider 130, 131 is chosen to bias the collector electrode of transistor 122 slightly above the highest emitter potential of transistor 122. The purpose of this is to prevent base-to-collector conduction of this transistor during the period between horizontal sweep pulses. Since the emitter potential of transistor 122 will rise with signal strength and may, for example, rise to +6 or 8 volts during reception of a strong signal, and the base may be at +8 volts, it is desirable to fix bias the collector to insure cutoff of the base collector diode of transistor 122 under these conditions between the horizontal pulses.

It will be understood that the voltage pulses in transformer winding 126 will be synchronized with the horizontal synchronizing pulses of the received televison signal. The winding 126 may be designed to apply a positive going pulse of approximately 14 volts peak to the collector of the NPN gate transistor 122 to supply a B+ potential at the same time a synchronizing pulse of the desired signal is applied to the base electrode thereof. Therefore, the level of conduction of transistor 122 is determined by the size of the synchronizing pulse applied to the base thereof, which latter pulse has an amplitude directly proportional to the level of the received signal. The emitter electrode of transistor 122 is connected to a reference ground through the emitter load resistor 135. Resistor 135 is shunted by a capacitor 137 so that the resultant signal 140 at the emitter of transistor 122 is of sawtooth form with a frequency of 15.75 kilocycles and an amplitude varying between approximately +4 to +8 volts dependent upon the strength of the received signal.

The output signal 140 at the emitter of the gate transistor 122 is applied through the resistor 142 to the base electrode of the AGC amplifier transistor 144. The transistor 144 is of the NPN type and includes an emitter which is connected to reference ground and a collector electrode which is connected through an output load resistor 146 to the B++ potential source. It can be seen that the level of signal 140 will increase due to an increase in the level of a received signal and the transistor 144 will then be driven into greater conduction thereby lowering the potential at its collector electrode.

In order that the control potential available at the collector of the AGC amplifier transistor 144 is a pure direct current voltage rather than the sawtooth potential 140 applied to the base electrode thereof, a degenerative filter system is utilized. In this circuit the major filter capacitor 150 is connected between the collector and base electrodes of transistor 144. This capacitor has a value considerably lower than that normally associated with proper filtering of a signal having a waveform such as 140. This circuit operates as a Miller integrator in which the capacity of capacitor 150 is effectively multiplied by the gain of transistor 144 so that proper filtering is obtained. From the equivalent circuit standpoint, capacitor 150 is effectively coupled from the base electrode of transistor 144 to ground. Furthermore, the operation of the circuit is such that the total RC time constant for filtering of the waveform 140 follows or "tracks" the amplitude of potential 140 since the effective filter capacitance is not significantly larger than necessary for smoothing the sawtooth waveform at various levels. This has the advantage of permitting the receiver gain control to follow more rapid signal level changes such as can occur with an airplane or the like causing signal reflections near the receiver antenna, and setting up a condition known as "airplane flutter" of the picture. The presently described circuit tends to overcome this condition by permitting the gain control system to respond rapidly as the signal changes while at the same time providing a very effective filtering of the gain control signal in order that components at the horizontal sweep frequency or the like do not cause variation in the actual gain control signal.

The gain control utilized to automatically control the gain of transistors 54 and 63 in the IF amplifier, and transistor 28 in the RF amplifier is accomplished by means of forward bias. That is, these transistors are normally fixed bias to provide a high maximum gain along the linear portion of the collector vs. base current curves for these transistors. In order to decrease the gain or amplification in them, the bias of the base electrodes is shifted to drive the respective transistors farther into conduction and toward the saturation region thereof. It has been found that the saturation region gives more linear operation with certain types of transistors which may be used. In comparison, with the transistors being operated near the cutoff region, as was commonly done with vacuum tubes, it should be noted that the gain would be reduced, but due to the rather sharp cutoff characteristic of these transistors, there would be introduction of distortion and cross modulation which would deteriorate receiver performance. It should be understood that the selection of forward or reverse bias for gain control of transistors is one of engineering choice and is not a limit of the system described herein.

In view of the above discussion it will be understood that as the desired signal level increases and the potential applied to the base of the gain control transistor 144 is increased, conduction of this transistor will increase to lower the potential at the collector electrode thereof. Or looking at it another way, the resistance between the lead 152 and ground will be decreased. The AGC lead 152 is connected between the collector electrode of transistor 144 and the contact 155 of the range switch. The switch arm 157 of the range switch (see also FIG. 2) is connected through a choke 159 to the IF AGC lead 58. Capacitors 161 and 162 are connected on each side of the choke 159 for bypass purposes. Therefore, the potential of the IF AGC lead 58 will be decreased toward ground potential and the potential of the base electrodes of transistors 54 and 63 will be lowered to increase the conduction thereof and decrease the gain as these transistors are driven toward operation in the saturation region.

The range switch includes a further section with an arm 165 ganged with arm 157. (See FIG. 2.) The arm 165 is connected to ground and the fixed terminal 167 is connected through resistor 169 to the AGC lead 152. The resistor 169 places a dummy load on the AGC lead in order to compensate for the disconnection of the RF amplifier transistor from the automatic gain control system in the illustrated position of the range switch. It may be noted that the range switch also includes a switch arm 171 which is connected to the RF AGC lead 32 and this switch is engaged with a fixed contact 173 which is connected to B+. Thus, the RF amplifier transistor 28 will be fixed bias according to the potential established by the resistors 30, 31 and no AGC voltage is applied. The illustrated position of the range switch is used for so-called fringe area reception where the received signals are normally weak and automatic gain control is effected only on the first two IF amplifier stages.

In a stronger signal area, which might be termed a "suburban" signal area, the range switch is manually set on a mid-position to apply AGC to the RF amplifier. Under these conditions the AGC lead 152 is connected through the contact 175 and the switch arm 171 to the RF amplifier AGC lead 32. (See also FIG. 2.) Therefore, this stage will be gain controlled. However, the switch arm 157 is also connected through the resistor 177 to the AGC lead 152 so that the resistance of resistor 177 is between the source of AGC potential and the IF AGC lead 158. This effectively provides an RF delay for the operation of the gain control system. The gain of the IF amplifier transistors 54 and 63 will be decreased by a fixed amount, for example 20 db, associated with the introduction of the resistor 177 between the leads 58 and 152. Accordingly, the level of the received signal, as demodulated and applied to the AGC system, must rise to a level higher than one associated with this gain reduction of the IF amplifier transistors before an automatic gain control potential will be produced. However, if the signal level rises more than this, the gain control potential will be produced and will then be applied to the transistors 54, 63 and 28.

It should also be recognized that it is desirable to introduce a rapid decrease in gain with respect to increase in signal strength for the RF amplifier transistor and a less rapid decrease in gain for the IF amplifier transistors. This can be accomplished by properly selecting the biasing resistors for the RF amplifier transistor 28. For example, a higher value of collector load resistor 182 will cause transistor 28 to saturate with the lower value of collector current. Also for a given value of resistor 31 and the associated resistance to B+ introduced by the AGC system, a decrease in the value of bleeder resistor 30 will increase the forward bias and establish the operating point of the transistor. It may be noted that the emitter bias resistor 184 is degenerative for direct current and will thus tend to delay saturation. Accordingly, it may be seen that by properly selecting the values of the resistors 182 and 184, as well as the value of resistor 30 with respect to the resistor 31, it is possible to change the rate of gain reduction for a given change of automatic gain control voltage. It is contemplated that with the range switch set in mid position so that arm 157 is engaged with contact 179 and arm 171 is engaged with contact 175, the automatic gain control becomes effective after the desired signal has increased to a predetermined level and any increase beyond this level will cause a rapid reduction in gain of the RF amplifier transistor 28 and a less rapid reduction in gain of the IF amplifier transistors 54 and 63.

The range switch has a still further position for local reception of strong signals and in this situation the connection of AGC lead 152 through the switch arms 157 and 171 to the AGC leads 58 and 32 is the same as that described for the medium signal conditions. (See FIG. 2.) However, the range switch includes a switch arm 186 which will be connected to the fixed terminal 187 under these conditions. Whereas in the previously described weaker signal operation, the switch arm 186 is connected to either terminal 189 or terminal 190, which connects the antenna switch 14 directly to the input tuning network 20 for the RF amplifier stage, the high level signal conditions connect a resistive attenuating network between the antenna selector switch 14 and the input tuning network 20. More particularly, it may be seen that the resistors 192 and 193 are series connected between switch terminals 187 and 189. Furthermore, resistor 194 is connected between the junction of resistors 192 and 193 and this resistor will have one terminal connected to ground through the switch arm 165 and the switch terminal 196. Thus, the input signals from the antenna will be divided by the resistors 193 and 194 and will be series attenuated by the resistor 192.

The gain control system of the present invention also has the advantage of very good clipping of impulse noise which exceeds the level of the synchronizing pulse tips of a desired signal. In addition, the system tends to maintain a given image contrast despite variations in input signal level. This maintenance of image contrast is achieved by operating the second video amplifier transistor 78 over its full range from near cutoff to near saturation. For example, the collector electrode thereof may be established at approximately —90 volts and the emitter may be established at approximately +12 volts. Thus, if the transistor 78 is driven into saturation, the collector voltage will approach plus 12 volts. At cutoff the collector voltage will be —90 volts. With good linearity of this transistor between cutoff and saturation, it can be operated over this wide range. Transistor 78 is operated as a class A amplifier producing a signal with the tips of the synchronizing pulses close to the saturation level in transistor 78. Accordingly, extraneous noise pulses which exceed the level of the synchronizing signal tips would actually drive transistor 78 into saturation thereby effectively clipping these noise pulses from the video signal at the output of the transistor 78. Furthermore, with the contrast control associated with video amplifier transistor 78 set for the full range or full signal swing, the automatic gain control system will tend to maintain the signal in this stage at this maximum level.

To set the controls in the emitter circuit of transistor 78, control 97 is set for maximum contrast and the AGC control 101 is adjusted so that the maximum white of the received signal occurs just short of the cutoff level of transistor 78 (short of white compression). The controls are bypassed and are not degenerative so picture contrast is reduced by changing the direct current axis of the signal at the collector of transistor 78 so that operation of the AGC system may reduce the signal swing in the receiver stages and at the picture tube. The base bias of the gate transistor 122 is set so that conduction thereof will cause the AGC to tend to clamp the synchronizing signal tips adjacent or near the saturation level of the transistor 78. If contrast control 97 is adjusted to less than maximum contrast, the bias of transistor 78 will be varied and the AGC system will reduce the signal in the receiver and the output of the video amplifier, but the automatic gain control system will tend to clamp the synchronizing signal tips very near the saturation level of the transistor 78 thereby still maintaining the noise clipping action for pulses exceeding the level of the synchronizing tips.

Figures 2, 3:
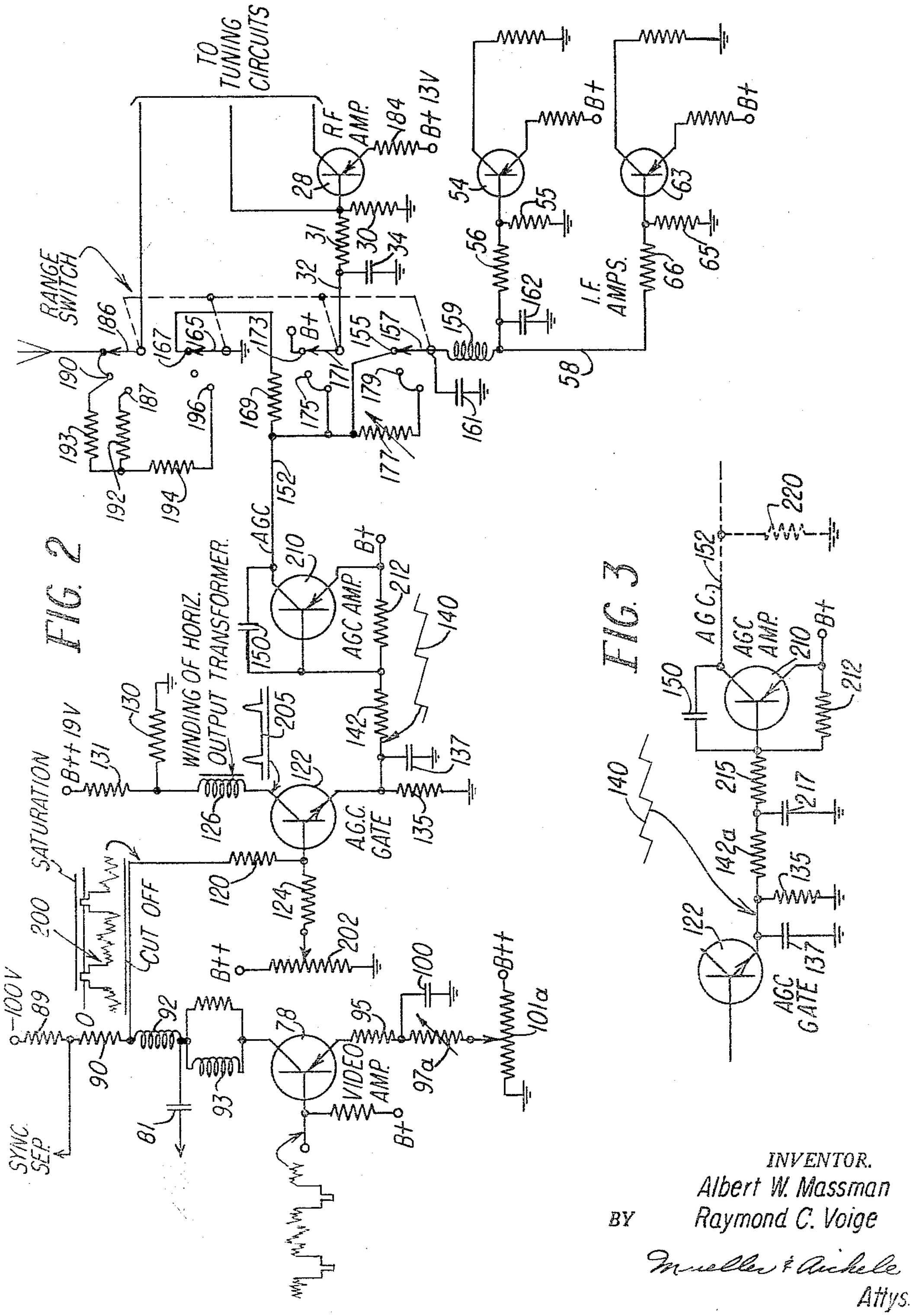
FIG. 2 is a schematic diagram illustrating a portion of the receiver of FIG. 1 and showing a modified form of the invention.
FIG. 3 is a partial schematic diagram of the circuit of FIG. 2 illustrating a still different circuit.

Considering now FIG. 2 of the drawings, there is shown a modification of the circuit of FIG. 1 wherein a PNP transistor is utilized as the AGC amplifier in place of the transistor 144 in the circuit of FIG. 1. In FIG. 2 only the essential elements of the AGC system have been shown in order to simplify the description and facilitate the understanding of the circuit operation. Components corresponding to the components of the circuit of FIG. 1 have been given the same reference characters and it will be understood that the circuit of FIG. 2 may be successfully used in the receiver of FIG. 1 by making the circuit changes discussed herein.

In the circuit of FIG. 2 there is shown a simplified circuit for biasing the emitter electrode of the video amplifier transistor 78. In adjusting the contrast control **97*a* and the AGC control 101*a*, the contrast control is set for maximum usable contrast, that is maximum bias on the emitter electrode, and the AGC control is varied to a point just short of where white limiting occurs in the reproduced television image. In other words, the control 101*a* is set at a point where the white peaks of the television image drive the transistor 78 close to cutoff. The contrast control 97*a*** may then be used to reduce the contrast from this maximum setting.

Just as in the circuit of FIG. 1 a signal such as waveform 200, shown at the junction of resistor 90 and coil 92 in the collector circuit of transistor 78, represents a maximum swing of the video signal between saturation and cutoff of the transistor. It will be observed that the synchronizing signal tips are above zero or ground potential when close to the relatively low positive potential existing on the emitter electrode of transistor 78 at saturation. Accordingly, clipping of input noise which exceeds the sync tip level is accomplished in this video amplifier.

Signal 200 is applied to the base electrode of the AGC gate transistor 122 through the resistor 120. There is also shown a variable resistor 202 having an arm connected to the base electrode of transistor 122 through the fixed resistor 124. The fixed portion of resistor 202 is connected between ground and B++. By variation of resistor 202 the point of conduction of transistor 122 can be accurately adjusted with respect to a given level of the synchronizing pulses applied thereto from the video amplifier. As previously indicated, the most desirable operation is that the gate transistor 122 becomes conductive when the synchronizing pulses very closely approach the saturation level of the transistor 78 as is shown in the representation of the waveform 200. Operation in this manner then affords best noise pulse reduction and maintenance of image contrast with variation in signal levels.

Since the synchronizing pulses of the signal applied to AGC gate transistor 122 extend on either side of a zero or ground potential axis, this greatly facilitates the direct drive of the base electrode of that transistor. That is, the signal need not be divided down or otherwise referenced to some high or low potential for the proper drive of transistor 122. By the same token, it is not necessary to "float" the emitter or other electrodes of the gating transistor 122 at some potential far removed from ground potential in order to accommodate a signal at some high voltage level. The circuit shown is advantageous since either dividing down the input signal would render the AGC less sensitive to signal change or floating the gate transistor electrode potentials would render the AGC undesirably responsive to voltage changes which might occur in the B+ potentials of the receiver due to line voltage variations or the like.

Also as explained in connection with the circuit of FIG. 1, the waveform 205, having pulses occurring at the horizontal scanning rate, is applied to the collector electrode of transistor 122 so that this transistor is in condition for conduction only during the occurrence of the corresponding synchronizing pulses in the received signal shown in the waveform 200. As will be be understood by those familiar with the television art, such a gated AGC system has the advantage of establishing the AGC only in response to the level of the synchronizing signal pulses of the received signal regardless of the average level of the video signal components which may occur between the synchronizing pulses. In a non-gated system it has been found that the AGC control may vary with picture content, that is, it will depend on whether the signal has a high or low average value due to the predominance of a dark or light tone of the reproduced image. Furthermore, by gating the AGC system, the system will be responsive only during the synchronizing pulses and any impulse noise which may occur during other portions of the signal will have no effect on the AGC since the gate transistor 122 will be cut off at such time. In non-gated AGC systems it has been found that under high noise level conditions the AGC can respond to this noise as though it were energy of a received signal thereby decreasing receiver gain in response to noise signals rather than in response to the level of the received signal.

The sawtooth waveform 140 appearing at the emitter electrode of transistor 122 increases in positive value upon an increase in the level of the desired signal due to the impressed positive potential on the collector electrode of this transistor and the increased conduction thereof in response to the waveform 200 applied to the base electrode. In this modified form of the circuit, the AGC amplifier transistor 210 is of the PNP type and this transistor is normally biased to a saturation condition so that the AGC lead 152 is normally at the B+ potential. A biasing resistor 212 is connected between the emitter and base electrodes of transistor 210. This resistor and resistors 142 and 135 form a voltage divider between B+ and ground for biasing the base electrode of transistor 210. The ground return for the collector of transistor 210 is provided through the base biasing networks of transistors 28, 54 and 63 in the RF and IF amplifier of the receivers.

With the transistor 210 normally in a saturation condition, the AGC lead 152 will be established at a potential substantially equal to the B+ potential and the potential on IF AGC lead 58, established through the switch portions 155 and 157, will be at the B+ potential. Accordingly, the voltage dividers 55 and 56 and 65, 66 will establish the base electrodes of transistors 54 and 63 at a positive value associated with the maximum gain thereof. However, as the base of transistor 210 is driven more positive by the waveform 140 upon an increase in signal level, transistor 210 will be driven out of saturation thus increasing its resistance as its conduction is reduced. Under these conditions, the potential on lead 58 will be reduced causing the base electrodes of transistors 54 and 63 to be lowered thereby increasing the conduction of these transistors. As previously explained, the transistors are driven into saturation for gain reduction purposes in which condition a greater change in input signal produces a lesser change in output signal.

It will be noted that the previous description of the gain reduction of transistor 54 and 63 is equally applicable to the gain reduction of RF amplifier transistor 28 when the range switch is in a position such that arm 171 is engaging contact 175.

The AGC amplifier circuit including transistor 210 also operates as a negative feedback amplifier in order to obtain proper filtering of the AGC control waveform 140 applied thereto. The system is essentially a Miller integrator so that the capacity of capacitor 150 is multiplied by the gain of transistor 210. The effect of this multiplied capacity is from the base electrode of transistor 210 to ground. Under weak signal conditions the transistor 210 is in saturation and the AGC filter capacitor 150 is shunted by a relatively low resistance. Therefore, the RC time constant of the AGC system is short. However, under such weak signal conditions the amplitude of the sawtooth waveform 140 is small and a short RC time constant is desirable in the filter network so that the AGC system will rapidly follow signal level changes while still providing proper filtering of the waveform 140.

On the other hand, under strong signal conditions the transistor 210 is driven out of saturation and toward a reduced conduction condition which greatly increases the capacity multiplication effect for the capacitor 150 and increases the resistance associated with this capacitor thereby increasing the RC time constant of the AGC filter system. Under such strong signal conditions the amplitude of the waveform 140 is increased and an increased filter action is necessary in order to successfully smooth out the variations of the waveform 140. Therefore, as the signal level increases to develop more AGC in the system, the effective filter capacity increases and the input impedance of the transistor 210 increases to maximize the production of a filtered direct current potential for AGC purposes. In summary it can be seen that the filtering effect in the AGC system follows or "tracks" the signal level for optimum system operation. Thus, the receiver can have the advantages of a relatively fast acting AGC system without the disadvantages normally encountered in such a system.

In a circuit of practical construction the component values were as follows:

| | | |
|---|---|---|
| Resistor 30 | ohms | 1800 |
| Resistor 31 | do | 220 |
| Transistor 28 (Motorola) | | 4484 |
| Capacitor 34 | microfarad | 1 |
| Transistors 54, 63 (Motorola) | | 4454 |
| Resistors 55, 65 | ohms | 2700 |
| Resistors 56, 66 | do | 1200 |
| Transistor 78 (Motorola) | | 4478 |
| Resistor 90 | ohms | 8200 |
| Resistor 89 | do | 560 |
| Resistor 95 | do | 47 |
| Resistor 97 | do | 250 |
| Resistor 98 | do | 2500 |
| Resistor 99 | do | 390 |
| Capacitor 100 | microfarads | 500 |
| Resistor 101 | ohms | 2500 |
| Resistor 103 | do | 390 |
| Resistor 120 | do | 33,000 |
| Transistor 122 (Motorola) | | 4465 |
| Resistor 124 | ohms | 22,000 |
| Resistor 130 | do | 8,200 |
| Resistor 131 | do | 680 |
| Resistor 135 | do | 10,000 |
| Capacitor 137 | microfarad | .01 |
| Resistor 142 | ohms | 4700 |
| Transistor 210 (Motorola) | | 4473 |
| Resistor 212 | ohms | 820 |
| Capacitor 150 | microfarads | 4 |
| Resistor 169 | ohms | 2,200 |
| Capacitor 161 | microfarad | .001 |
| Capacitor 162 | do | 1 |
| Resistor 177 | ohms | 1500 |

In FIG. 3 there is shown a modification of the circuit of FIG. 2 which utilizes a different filtering scheme for the signal applied from the AGC gating transistor 122 to the AGC amplifier transistor 210. In this circuit, the waveform 140 the amplitude of which represents the strength of a received signal is applied from the emitter of transistor 122 through the resistors 142*a* and 215 to the base electrode of transistor 210. The filter capacitor 217 is connected between the junction of resistors 142*a* and 215 to ground. It is contemplated that capacitor 217 will have a relatively large value to filter the waveform 140 and provide a relatively ripple-free DC control potential at the base of transistor 210. Resistor 220 represents the load of the associated circuits which are gain controlled.

In a system of practical construction in accordance with FIG. 3, the resistor 142*a* may have a value of 6800 ohms, the resistor 215 may have a value of 4700 ohms, and the capacitor 217 may have a value of 10 microfarads. The remaining components may have the same values as the corresponding components in the circuit of FIG. 2.

It can be recognized that by the addition of the capacitor 217 and the additional resistance in the base circuit of the transistor 210 the RC time constant of the AGC filtering network will be increased by a substantial amount. When the portion of this resistance and the capacitor 217 are removed, as in the circuit of FIG. 2, entirely comparable and sufficient filtering is provided by the degenerative feedback system including capacitor 150 connected between the output and input of the transistor 210. Therefore, the circuit of FIG. 2 is preferred since the proper AGC filtering is obtained while at the same time the RC time constant of the circuit is minimized to permit a more rapid response of the AGC system to a change in signal input level.

It should be recognized that in the circuit of FIG. 3 capacitor 150 will not fulfill the roll of filtering in the AGS control potential as in the circuit of FIG. 2 since this filtering is provided by other means. Capacitor 150 does, however, have a beneficial function in the circuit of FIG. 3. There is a variable RC time constant network connected through the AGC lead 152 to the base electrodes of the RF and IF amplifier transistors 28, 54 and 63. This is because the equivalent resistance of transistor 210 varies as its conduction is varied by a change in input signal level. By utilizing the capacitor 150 it is found that the time constant of the AGC amplifier circuit, including the transistor 210 as connected to the AGC lead 152, is more stable with signal level change thereby stabilizing the equivalent RC time constant of the AGC system connected to the RF and IF amplifier transistors.

The above described invention provides, therefore, a gain control circuit which is particularly adapted for a transistorized television receiver. The system has the known advantages of a gated automatic gain control circuit associated in part with tube circuits. The gain control system is further very effective in following rapid changes in signal input level and displays an unusual speed of response. It should also be recognized that because of the somewhat limited gain control effectiveness which is possible with transistors in the present state of their development, in addition to the possibility that a battery operated portable television receiver may be operated at times in extremely strong signal areas and at other times in extremely weak signal areas, the present gain control system includes means for establishing different broad ranges within which the automatic gain control may operate. It will be appreciated that the described gain control system is operative to reduce distortion and other types of nonlinear operation in the gain controlled stages while at the same time the system has proven very effective in maintaining a relatively constant image contrast of the reproduced picture and affording a high degree of noise protection in overall operation of a television receiver.

We claim:

1. In a receiver for wave signals, the combination of signal amplifier means for the received signal having an amplifier device and bias circuit means for establishing the gain thereof, detector means coupled to said amplifier means for demodulating the received signal, an automatic gain control transistor having input, common and output electrodes, circuit means direct current coupling said input electrode to said detector for changing the conduction level of said transistor in accordance with changes in the level of the received signal, circuit means coupling said output electrode to said bias circuit means for changing the bias of said signal amplifier means and controlling the gain thereof in indirect relation to the level of the received signal, means connected to said common electrode for energizing said transistor, and filter capacitor means connected between said input and output electrodes of said transistor for degenerative feedback between said input and output electrodes to provide a filtered direct current potential for said bias circuit means at said output electrode.

2. In a receiver for wave signals, the combination of signal amplifier means for the received signal having an amplifier device and bias circuit means for establishing the gain thereof, detector means coupled to said amplifier means for demodulating the received signal, an automatic gain control amplifier transistor having an input base electrode, a common emitter electrode and an output collector electrode, circuit means direct current coupling said base electrode to said detector means for changing the conduction level of said transistor in accordance with changes in the level of the received signal, circuit means coupling said collector electrode to said bias circuit means for changing the bias of said signal amplifier means and controlling the gain thereof in indirect relation to the level of the received signal, energizing circuit means connected to said emitter electrode, and capacitor means connected between said base and collector electrodes of said transistor for degenerative feedback from said collector electrode to said base electrode to provide a filtered direct current potential for said bias circuit means.

3. In a television receiver for wave signals, the combination of signal amplifier means for the received signal having amplifier device and bias circuit means for establishing the gain thereof, detector means coupled to said amplifier means for demodulating the received signal, an automatic gain control transistor having input and output electrodes, time gated circuit means connected between said detector means and said input electrode and applying to said input electrode a partially filtered signal which is amplitude varying with signal level of the received signal for changing the conduction level of said transistor in accordance with changes in the level of the received signal, circuit means coupling said output electrode to said bias circuit means for changing the bias of said signal amplifier means and reducing the gain thereof in indirect relation to the level of the received signal, and capacitor means connected between said input and output electrodes of said transistor for degenerative feedback between such electrodes to provide a filtered direct current potential for said bias circuit means.

4. In a receiver for wave signals, the combination of signal amplifier means for the received signal having an amplifier device and first bias circuit means for establishing the gain thereof, detector means coupled to said amplifier means for demodulating the received signal, an automatic gain control amplifier transistor having base, emitter and collector electrodes, second bias circuit means connected to said electrodes to establish said transistor in a saturation condition, circuit means direct current coupling said base electrode to said detector means for reducing the conduction level of said transistor in accordance with increases in the level of the received signal, a capacitor coupled between said base and collector electrodes to filter the representation of the received signal applied to said base electrode, and circuit means coupling said collector electrode to said first bias circuit means for changing the bias of said signal amplifier means and controlling the gain thereof in indirect relation to the level of the received signal.

5. In a superheterodyne television receiver for television signals, the combination of radio frequency amplifier means for the received signal having an amplifier device and first bias circuit means for establishing the gain thereof, intermediate frequency amplifier means for the received signal having an amplifier value and second bias circuit means for establishing the gain thereof, detector means coupled to said intermediate frequency amplifier means for demodulating the received signal, an automatic gain control transistor having input and output electrodes, circuit means direct current coupling said input electrode to said detector means for changing the conduction level of said transistor in accordance with changes in the level of the received signal, further circuit means direct current coupled between said output electrode and said first and second bias circuit means, said further circuit means including a transistorized active filter and a multiposition switch, said switch having a first position for applying an automatic gain control potential to said second bias circuit means and a fixed maximum gain bias to said first bias circuit means, and said switch having a second position for applying the automatic gain control potential to said first bias circuit means and simultaneously applying the automatic gain control potential together with a fixed gain reducing bias to said second bias circuit means thereby providing an effective delay for the reduction gain of said radio frequency amplifier means upon increase in the level of the received signal.

6. In a television receiver for signals having video, horizontal and vertical signal components, the combination of signal amplifier means with an amplifier device and bias circuit means for establishing the gain thereof, detector means coupled to said amplifier means for demodulating a received signal, transistorized video amplifier circuit means direct current connected to said detector means and including energizing circuit means with a variable gain control for a transistor thereof, an NPN gating transistor having base, collector and emitter electrodes, direct current circuit means for applying the signal components from said video amplifier circuit means to said base electrode of said NPN transistor, circuit means for applying pulses in time coincidence with the horizontal signal components and a fixed bias to said collector electrode of said NPN transistor for controlling the conduction thereof in accordance with changes in the level of the horizontal signal components of the received signal, a PNP amplifier transistor having base, emitter and collector electrodes, direct current circuit means connected between said emitter electrode of said NPN transistor and said base electrode of said PNP transistor, a filter capacitor connected between said base and collector electrodes of said PNP transistor to provide the major filtering of the signal applied thereto from said gating transistor, and direct current circuit means connecting said collector and emitter electrodes of said PNP transistor to said bias circuit means for regulating the gain of said signal amplifier means in indirect relation to the level of the received signals.

7. In a television receiver for signals having video, horizontal and vertical signal components, the combination of signal amplifier means with an amplifier device and bias circuit means for establishing the gain thereof, detector means coupled to said amplifier means for demodulating a received signal, transistorized video amplifier circuit means direct current connected to said detector means, a gating transistor having first, second and third electrodes, direct current circuit means for applying the signal components from said video amplifier circuit means to said first electrode, means for applying pulses in time coincidence with the horizontal signal components to said second electrode of said gating transistor for controlling the conduction thereof in accordance with changes in the level of the horizontal signal components of the received signal, an amplifier transistor having an input and a pair of output electrodes, direct current circuit means connected between said third electrode and said input electrode for reducing conduction of said amplifier transistor in response to the conduction changes of said gating transistor, a filter capacitor connected to said amplifier transistor for filtering the signal applied thereto from said gating transistor, and direct current circuit means connected to said output electrodes for normally biasing said amplifier transistor to a saturation condition and circuit means connecting said output electrodes to said bias circuit means for regulating the gain of said signal amplifier means in indirect relation to the level of the received signals with the impedance between said output electrodes increasing with increase in signal level.

8. In a television receiver for signals having video, horizontal and vertical signal components, the combination of signal amplifier means with an amplifier device and bias circuit for establishing the gain thereof, detector means coupled to said amplifier means for demodulating a received signal, transistorized video amplifier means direct current connected to said detector means and including energizing circuit means for operating the same so that the peaks of the horizontal and vertical signal components of the demodulated signal may be developed about a zero voltage reference axis in the receiver and near the saturation level of the transistor in said video amplifier means, a gating transistor having base, collector and emitter electrodes, direct current circuit means for applying the signal components substantially undivided from said video amplifier means to said base electrode, means for applying pulses in time coincidence with the horizontal signal components between said collector and emitter electrodes of said gating transistor for controlling the conduction thereof in accordance with changes in the level of the horizontal signal components of the received signal, bias circuit means for said collector and emitter electrodes for establishing cutoff between said base and collector electrodes between said pulses, an amplifier transistor having input and output electrodes, direct current circuit means connected in circuit with said emitter and collector electrodes and to said input electrode, a filter capacitor connected to said input electrode of said amplifier transistor for filtering the signal applied thereto from said gating transistor, and direct current circuit means connecting said output electrode to said bias circuit for regulating the gain of said signal amplifier in indirect relation to the level of the received signals.

9. In an automatic gain control system for a television receiver utilizing signals having video, horizontal and vertical signal components, the combination of signal amplifier means for the received signal having bias circuit means for establishing the gain thereof, detector means coupled to said amplifier means for demodulating the received signal, a gating transistor having base, emitter and collector electrodes, means connected between said detector means and said base electrode to apply the demodulated signal to said base electrode, a bias voltage source, pulse supply means for producing pulses in timed coincidence with the horizontal signal components to gate said transistor on during the presence of said pulses, a load resistor connected in a series circuit with said pulse supply means, said bias voltage source, and said emitter and collector electrodes whereby a voltage proportional to the level of the received signal is developed across said load resistor, the voltage of said bias voltage source being proportioned to prevent base-to-collector conduction during the period between said pulses, and filter means coupled between said load resistor and said bias circuit means, whereby the gain of said signal amplifier means is regulated.

10. An automatic gain control system for a television receiver utilizing a signal having video, horizontal and vertical signal components, the combination of signal amplifier means for the received signal having bias circuit means for establishing the gain thereof, detector means coupled to said amplifier means for demodulating the received signal, a transistor having input, common and output electrodes, means coupling said detector means to said input electrode to apply the signal components of the received signal thereto, means for producing pulses in timed coincidence with the horizontal signal components for gating said transistor on during the presence of said pulses, conduction restricting means for said transistor, a load impedance for developing a gain control potential, means connecting said load impedance, said conduction restricting means and said means for producing pulses in series circuit between said common and output electrodes of said transistor so that the conduction of said transistor is controlled by the pulses and the horizontal signal components in accordance with changes in the amplitude of such signal components, said conduction restricting means preventing continued conduction from said output electrode to said input electrode between pulses, and filter means coupling the gain control potential from said load impedance to said bias circuit means for regulating the gain of said amplifier means in accordance with the level of the received signal.

11. An automatic gain control system for a television receiver utilizing a signal having video, horizontal and vertical signal components, the combination of transistorized signal amplifier means for the received signal having bias circuit means for reducing the gain thereof with an increase of forward bias on a first transistor therein, detector means coupled to said amplifier means for demodulating the received signal, a second transistor having input, common and output electrodes, means coupling said detector means to said input electrode to apply the signal components of the received signal thereto, means for producing pulses in timed coincidence with the horizontal signal components for gating said second transistor on during the presence of said pulses, conduction restricting means for said second transistor, a load impedance for developing a gain control potential, means connecting said load impedance, said conduction restricting means and said means for producing pulses in series circuit between said common and output electrodes of said second transistor so that the conduction of said second transistor is controlled by the pulses and the horizontal signal components in accordance with changes in the amplitude of such signal components, said conduction restricting means preventing continued conduction from said output electrode to said input electrode between pulses, and filter means coupling said load impedance to said bias circuit means, said second transistor being poled to develop a control potential for increasing the forward bias of said first transistor in said signal amplifier means upon increase in the level of the received signal.

References Cited by the Examiner

UNITED STATES PATENTS

| | | | |
|---|---|---|---|
| 2,617,929 | 11/1952 | Spindler | 178—7.3 |
| 2,855,458 | 10/1958 | Rogers | 178—7.3 |
| 2,866,892 | 12/1958 | Barton | 330—29 |
| 2,878,311 | 3/1959 | Squires | 178—7.3 |
| 2,878,312 | 3/1959 | Goodrich | 178—7.5 |
| 2,906,817 | 9/1959 | Kidd | 178—7.3 |
| 2,921,131 | 1/1960 | Bonner | 178—7.3 |
| 2,977,411 | 3/1961 | Goodrich | 178—7.3 |
| 2,979,563 | 4/1961 | Kidd | 178—7.5 |
| 3,049,591 | 8/1962 | Voige | 178—7.3 |
| 3,060,329 | 10/1962 | Harrison | 307—88.5 |
| 3,084,216 | 4/1963 | Tschannen | 178—7.3 |

DAVID G. REDINBAUGH, *Primary Examiner.*

J. McHUGH, R. L. RICHARDSON, *Assistant Examiners.*